(No Model.)

A. G. CROW.
HAY AND GRAIN UNLOADER.

No. 247,172. Patented Sept. 20, 1881.

Witnesses,
Geo. H. Strong.
Frank A. Brooks.

Inventor
Anerson G. Crow
By Dewey & Co.
Attys.

UNITED STATES PATENT OFFICE.

ANERSON G. CROW, OF WILLOW, CALIFORNIA.

HAY AND GRAIN UNLOADER.

SPECIFICATION forming part of Letters Patent No. 247,172, dated September 20, 1881.

Application filed March 12, 1881. (No model.)

*To all whom it may concern:*

Be it known that I, ANERSON G. CROW, of Willow, county of Colusa, State of California, have invented an Improved Hay and Grain Unloader; and I hereby declare the following to be a full, clear, and exact description thereof.

My invention relates to certain improvements in hay and grain unloaders; and it consists in such peculiar construction as will enable the implement to elevate the body of a loaded header-wagon, or a rack, or any such receptacle for hay and grain, and throw its load upon a stack or into a barn.

The invention relates to and is an improvement upon the hay pitcher and stacker patented December 16, 1879, No. 222,583.

Figure 1:
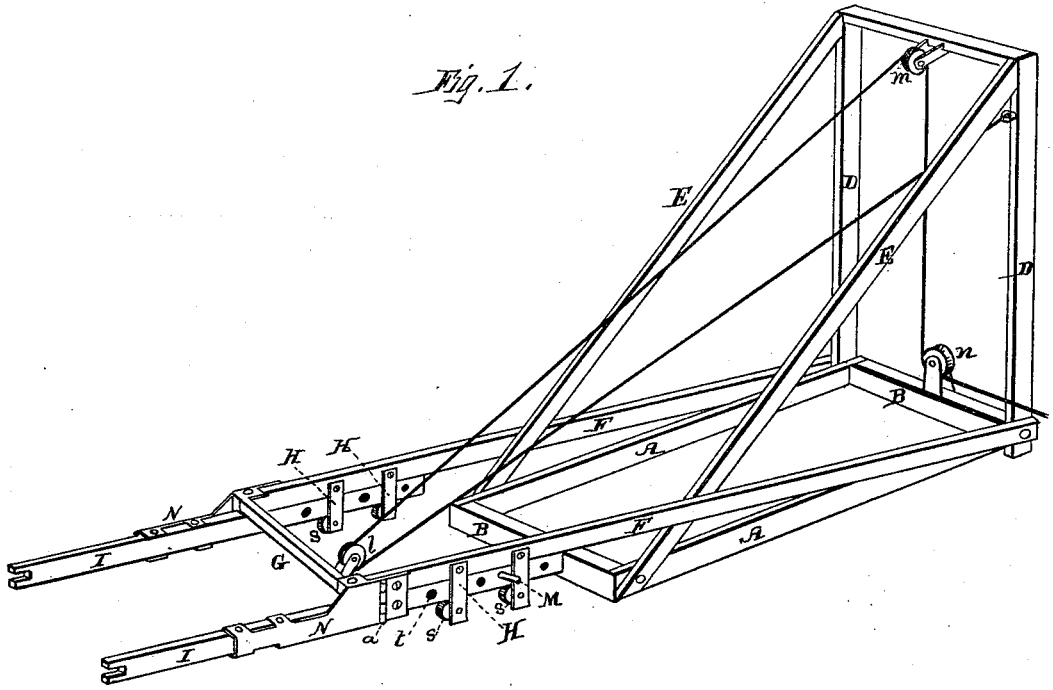
Figure 2:
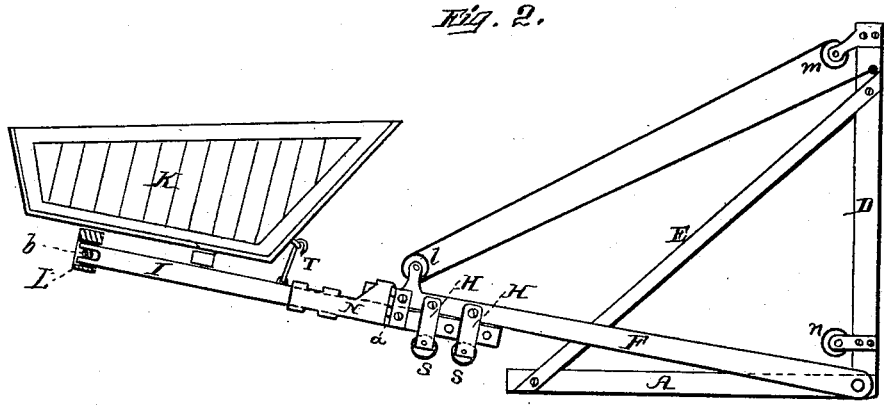
Figure 3:
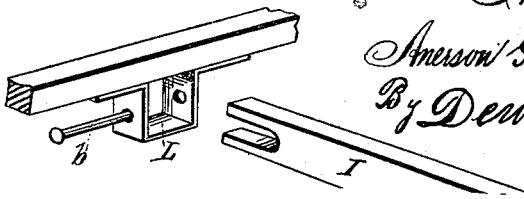

Referring to the accompanying drawings, Figure 1 is a view of my invention. Fig. 2 is a side view showing its application. Fig. 3 is a detail of construction.

The frame of the lifter consists of the side bars or timbers, A, and the end cross-bar, B. These form a base for the frame, and are further braced in any manner. At the front of the machine are the vertical standards D, of any desirable height and braced in any suitable way.

E E are inclined side bars extending from the rear of the base of the frame to the top of the vertical standard D, as shown.

F represents the elevating-arms, pivoted to the front of the base of the machine at the bottom of the vertical standards D. This construction is similar to that in the patent above referred to, and likewise I employ the pulleys and ropes necessary to raise the elevating-arms F F. I have here shown pulleys *l* upon the rear of the elevating-arms F F, and pulleys *m* upon the upper ends of the standards D of the frame, and other pulleys, *n*, at the bottom of the said vertical standards at the base of the frame, Fig. 2. The ropes are attached at the upper ends of the vertical standards, or to the top of the frame, and pass down to the pulleys *l*, and up again over the pulleys *m*, down to the pulleys *n*.

In the invention of which this is an improvement the ends of the elevating-arms are provided with a fork or rack, upon which the loose hay is raked by a traveling rake. This rack is attached to the machine, and nothing can be elevated unless put upon it. It is intended simply to elevate loose hay put upon it.

My improvement has for its object the employment of the elevating device in raising the entire bed of a header-wagon, with its load, or of any kind of rack, and discharging the load where needed. To do this I have invented a method of coupling the device to the header-wagon and racks. This will allow the hay or grain to be gathered in distant parts of the field and deposited in a wagon, which will carry it to the machine. G represents a cross-bar joining the ends of the arms F F. To these arms are attached the hanging guides or stirrups H, in which are supported the supplementary arms or bars I. These arms slide under the elevating-arms F F, within the stirrups H, and can be slipped forward to join to the wagon or pushed back out of the way. In the lower part of the stirrups anti-friction rollers *s* are fitted to support the weight of the arms and allow them to be easily pushed back and forth. The outer ends of these arms are bifurcated or notched, as shown.

Let K represent the body or bed of a header-wagon. Under this bed, upon the longitudinal timbers or supports, are the sockets L, having a pin, *b*, through them, as shown. The arms I pass under the bed K and into the sockets L, in which their forked or notched ends fit the transverse pins *b*. When the elevating-arms F are raised the arms I will lift the bed from the wagon. Transverse pins or bolts M through the arms I in front of the stirrups H, and having projecting ends, prevent the arms from slipping down through the stirrups when in a vertical position.

I have here shown the pin M as placed in front of the rear guide or stirrup. For the purpose of supporting the weight of the load this stirrup is made very strong. A series of holes, *t*, are made in the arms to receive the pin M, whereby the arms I may be adjusted to fit the sockets under the wagon-bed, whether the wagon is driven close up to the front or a little farther away. The forked ends of the arms I fitting the pins *b* prevent the bed from slipping upon the arms, and from falling from them when elevated beyond the vertical to discharge its load.

The wagon can be driven up across the end of the elevating-arms, and as near to them as desirable. The arms I are then slipped out under the bed K into the sockets L. The pins M are put through the arms I in front of the stirrups. When power is applied to the end of the rope the arms F and supplementary arms I raise the bed K and turn its load upon the stack or into the barn; then it is returned to the wagon. The arms, I when not in use, are pushed back under the arms F and are out of the way. It is obvious that this can as well be used on a rack or any receptacle to be elevated, and will stack or raise hay and grain or anything of like nature requiring to be raised or stacked.

By staking the machine to resist the pull it can be kept in place to return the bed or body to the wagon with precision.

In order to brace the sliding arms or bars I at the point which is subjected the most to the strain, I use the hinged clamps N, having projecting flanges for embracing the arms I and F. One end of these clamps is attached to the outside of the arms F, while the front end embraces the arms I. These clamps are hinged at $a$, so that the front end, which clamps the arms I, may be turned or folded back, and not project in front of the arms F. This is for the purpose of allowing the wagon to be driven up close to the machine. The arms I are pushed in and the clamps N are folded back. The wagon is then driven up as close as desirable, the arms I pushed out, and the clamps N turned forward to clasp the arms I, and the connection is complete. Pins pass through the flanges on the clamps and secure them to the arms. This clamping-brace would render material support to the sliding arms in windy weather.

The sockets L under the wagon-bed may be formed as here shown, or in any practicable manner. I have found that it is best to put them only upon the farthest one of the longitudinal supports of the bed, so that the arms I can be fitted into them without the trouble of carefully placing the wagon to get the sockets in line, if they were placed in two rows.

In order to prevent the bed from getting out of place, (in windy weather, for instance,) I place the hook and staple T upon the bed and the arms I, whereby the bed will be held down.

This invention is useful and well adapted when loose hay is raised in windy weather, much of which is liable to be blown away. With this the hay or grain can be elevated in a body and will not be blown off. It can be gathered all over the field with more ease and brought to the machine in a body, the advantage of which is plain.

Having thus described my invention, what I claim as new, and desire to secure by Letters Patent, is—

1. In combination with the frame consisting of the base A and B, the vertical standard D, inclined bars E, and the elevating-arms F, with the operating pulleys and ropes, as shown, the sliding arms or bars I, with forked outer ends, supported under the arms F by stirrups H, and retained in place by the pins M, said sliding arms being thereby adapted to be pushed out under the bed or body of a wagon, or under a rack, and to fit into sockets therein, whereby the bed or rack is coupled to the machine, and can be raised to discharge its contents above, substantially as described.

2. In combination with the supporting-base A B and hinged elevating-arms F, with their operating ropes and pulleys, the sliding extension-bars I, having their ends formed to connect with the wagon-body or rack, so that the latter may be lifted, the sliding arms I being perforated with holes $t$ and provided with the pin M, whereby the arms may be extended to connect with the wagon-body at different distances from the frame, and held rigidly when the connection has been made, substantially as described.

3. In combination with the supporting-frame A B, hinged elevating-arms F, and sliding extension-bars I, the hinged braces or clamps N, rigidly connected with the elevating-arms F, said clamps being capable of clasping and bracing the extension-bars I, or turning back upon the frame when the bars are withdrawn, substantially as described.

In witness whereof I have hereunto set my hand.

ANERSON G. CROW.

Witnesses:
S. H. NOURSE,
FRANK H. BROOKS.